(12) United States Patent
Mayer

(10) Patent No.: US 9,403,515 B2
(45) Date of Patent: Aug. 2, 2016

(54) PRESSURE TRANSMISSION DEVICE FOR A VEHICLE, POWER-ASSISTED BRAKING SYSTEM AND METHOD

(75) Inventor: Jochen Mayer, Giengen An der Brenz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 33 days.

(21) Appl. No.: 13/977,292

(22) PCT Filed: Oct. 28, 2011

(86) PCT No.: PCT/EP2011/068951
§ 371 (c)(1),
(2), (4) Date: Sep. 25, 2013

(87) PCT Pub. No.: WO2012/089362
PCT Pub. Date: Jul. 5, 2012

(65) Prior Publication Data
US 2014/0015309 A1    Jan. 16, 2014

(30) Foreign Application Priority Data
Dec. 28, 2010 (DE) .......................... 10 2010 064 266

(51) Int. Cl.
*B60T 15/06* (2006.01)
*B60T 13/14* (2006.01)
*B60T 8/42* (2006.01)
*B60T 8/44* (2006.01)
(Continued)

(52) U.S. Cl.
CPC .............. *B60T 13/14* (2013.01); *B60T 8/4266* (2013.01); *B60T 8/441* (2013.01); *B60T 8/489* (2013.01); *B60T 13/586* (2013.01)

(58) Field of Classification Search
CPC ... B60T 11/224; B60T 11/244; B60T 11/245; B60T 13/24
USPC .............. 303/114.1–114.3; 60/550, 555, 563; 188/152, 356–358
See application file for complete search history.

(56) References Cited

U.S. PATENT DOCUMENTS 2,078,209 A * 4/1937 Sanford et al. ................. 188/348
2,680,349 A * 6/1954 Hill et al. ......................... 60/555
(Continued)

FOREIGN PATENT DOCUMENTS

DE    196 40 767    4/1998
DE    100 44 820    10/2001
(Continued)

OTHER PUBLICATIONS

International Search Report, PCT International Application No. PCT/EP2011/068951, dated Jun. 5, 2012.

*Primary Examiner* — Christopher Schwartz
(74) *Attorney, Agent, or Firm* — Norton Rose Fulbright US LLP

(57) ABSTRACT

A pressure transmission device for a power-assisted braking system of a vehicle; at its inlet, the pressure transmission device being connectible in a hydraulically operative manner to a master brake cylinder of the power-assisted braking system, and at its outlet, the pressure transmission device being connectible in a hydraulically operative manner to a wheel brake cylinder of the power-assisted braking system; the pressure transmission device including an accumulator and a linkage, which transmits a pressure difference between the inlet and the outlet to the accumulator and stores it in this.

21 Claims, 5 Drawing Sheets

(51) Int. Cl.
  *B60T 8/48*       (2006.01)
  *B60T 13/58*      (2006.01)

(56) References Cited

U.S. PATENT DOCUMENTS

| | | | | |
|---|---|---|---|---|
| 2,929,363 | A | * | 3/1960 | Stelzer ................... 91/417 R |
| 2,978,871 | A | * | 4/1961 | Rockwell ................... 60/550 |
| 3,406,520 | A | * | 10/1968 | Casellas ................... 60/563 |
| 3,838,572 | A | * | 10/1974 | Remillieux ................... 60/400 |
| 3,910,645 | A | * | 10/1975 | Takeuchi et al. ........... 303/114.1 |
| 4,334,713 | A | * | 6/1982 | Dauvergne ............ B60T 13/141 303/54 |
| 4,702,531 | A | * | 10/1987 | Kircher et al. ............. 303/114.1 |
| 4,848,168 | A | * | 7/1989 | Negishi ................... 73/865.8 |
| 5,143,429 | A | * | 9/1992 | Higashimata et al. ..... 303/115.2 |
| 5,312,172 | A | | 5/1994 | Takeuchi |
| 6,354,673 | B1 | | 3/2002 | Feigel et al. |
| 2010/0114444 | A1 | | 5/2010 | Verhagen et al. |

FOREIGN PATENT DOCUMENTS

| | | |
|---|---|---|
| DE | 10 2007 016 864 | 10/2008 |
| JP | 59-216757 | 12/1984 |
| JP | 5-238373 | 9/1993 |
| JP | 2006-306288 | 11/2006 |
| JP | 2007-22105 | 2/2007 |

* cited by examiner

PRESSURE TRANSMISSION DEVICE FOR A VEHICLE, POWER-ASSISTED BRAKING SYSTEM AND METHOD

BACKGROUND INFORMATION

German Patent Application No. DE 10 2007 016 864 A1 describes a brake system for a vehicle, the brake system including an electromechanically boosted braking element and a pedal simulator, which is used for conveying a haptic braking feel to the driver in a usual manner. The brake system is manufactured as a brake-by-wire system, in which the movement of the brake pedal is measured sensorially and actuating signals for actuating an electric brake actuator in the braking element are generated by a control unit. A mechanical through-grip device is situated between the brake pedal and the braking element, the mechanical through-grip device being decoupled in the normal case, however, due to the design as a brake-by-wire system, and only being used in emergencies, such as a failure of the electromechanical brake boosting, in which case the force exerted on the brake pedal by the driver is used as the actuating force for the braking element. On the other hand, in the normal case, the pedal force generated by the driver is not mechanically converted into a braking force.

SUMMARY

An example pressure transmission device, an example power-assisted braking system, an example vehicle, and an example method in accordance with the present invention provide the advantage that since the foot force of the driver is always included during braking, a power consumption turns out to be smaller than, e.g., in the case of brake-by-wire systems. In addition, the pressure transmission device is placed in the brake circuit, thus, not in the region of the pedals or the brake booster, and is therefore independent of the brake booster technology utilized. In this manner, the pressure transmission device may easily be integrated into an ordinary brake system having, for example, a vacuum brake booster or an electromechanical brake booster. Furthermore, in the case of the power-assisted braking system, it is possible to variably distribute the brake pressure generated by the driver using the force of his foot and the brake pressure generated by the brake booster, between the wheel brake cylinders and the accumulator.

For recuperative braking, it is possible for the power-assisted braking system and the pressure transmission device to be used to reduce the brake pressure at one or all axles of the vehicle.

In the case at hand, "recuperative braking" means the recovery of kinetic energy of the vehicle in the form of electrical energy while braking a wheel of the vehicle.

BRIEF DESCRIPTION OF THE DRAWINGS

Exemplary embodiments of the present invention are shown in the figures and explained in greater detail below.

DETAILED DESCRIPTION OF EXAMPLE EMBODIMENTS

Figure 1:
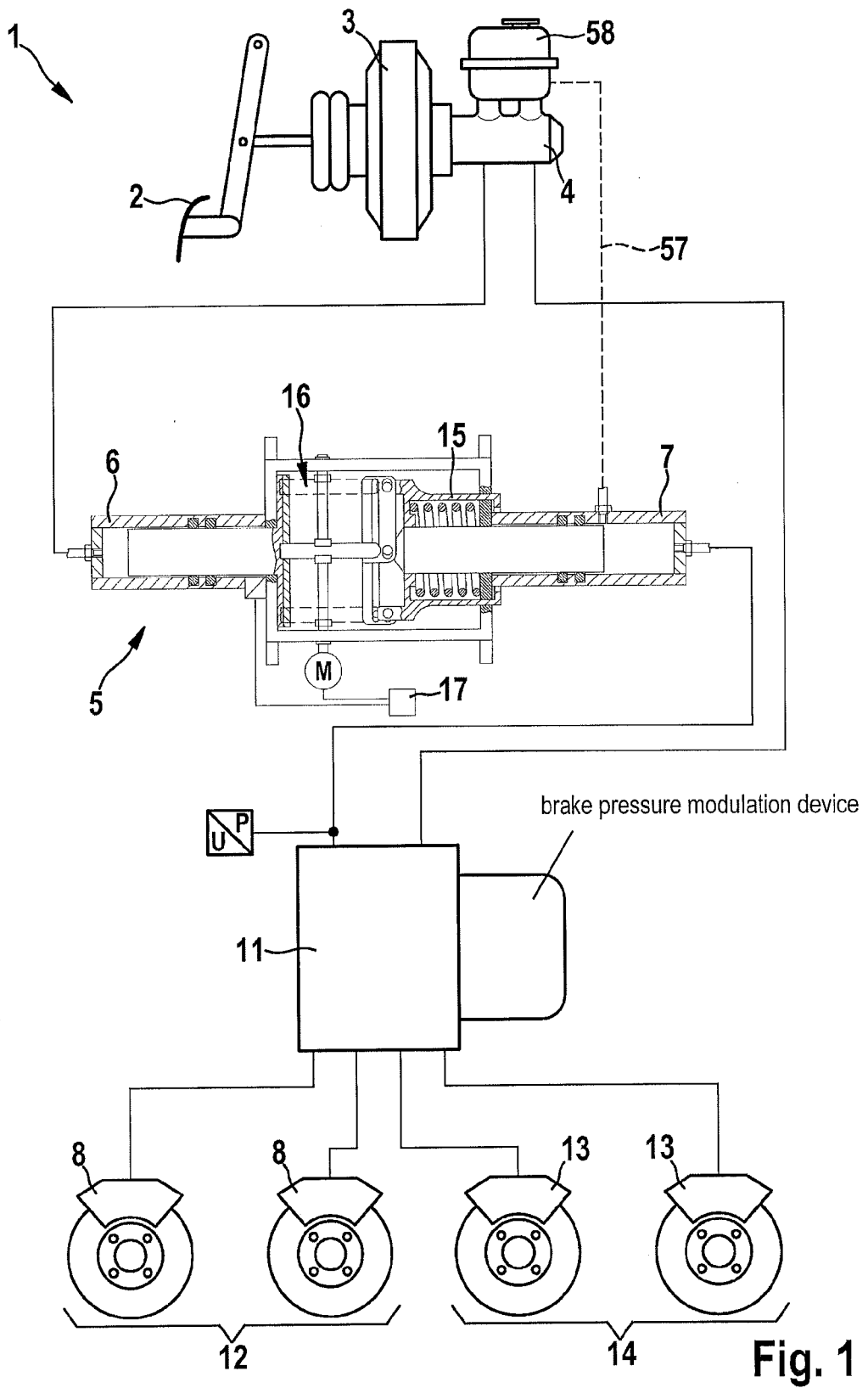
FIG. 1 shows a schematic of a power-assisted braking system according to a first exemplary embodiment of the present invention.

In the figures, like or functionally equivalent elements are denoted by like reference numerals, provided that nothing is indicated to the contrary. In the figures, hydraulic lines are represented as solid or dashed lines and are only provided with reference numerals where relevant.

Below, a first exemplary embodiment of the present invention is explained in greater detail with reference to FIGS. 1 and 2.

Power-assisted braking system 1 is preferably a part of a hybrid or electric vehicle.

Power-assisted braking system 1 has a brake pedal 2, which actuates a master brake cylinder 4 with the aid of a brake booster 3. Brake booster 3 may take the form of, e.g., a vacuum brake booster or electromechanical brake booster. Master brake cylinder 4 is, in particular, a tandem brake cylinder.

Power-assisted braking system 1 further includes a pressure transmission device 5. At its inlet 6, pressure transmission device 5 is hydraulically connected to a chamber of master brake cylinder 4 not shown in further detail. At its outlet 7, pressure transmission device 5 is hydraulically connected to two wheel brake cylinders 8 via a brake pressure modulation device 11. Brake pressure modulation device 11 has, for example, a driver assistance system, such as an anti-lock braking system ABS, anti-slip regulation system ASR or an electronic stability program ESP.

The first chamber of master brake cylinder 4, pressure transmission device 5, brake pressure modulation device 11 and wheel brake cylinders 8 form a first brake circuit 12.

Power-assisted braking system 1 further includes two wheel brake cylinders 13, which form, together with brake pressure modulation device 11 and a second chamber of the master brake cylinder 4 not shown, a second brake circuit 14.

Pressure transmission device 5 transmits a pressure difference between its inlet 6 and its outlet 7 to an accumulator 15, in particular, a stored-energy spring mechanism, via a linkage 16; the pressure difference being stored in accumulator 15 in the form of potential energy (in this case, spring energy).

Power-assisted braking system 1 further includes a control device 17. Control device 17 controls a pressure transmitted by pressure transmission device 5 between its inlet 6 and its outlet 7 in such a manner, that in response to a pressure change at outlet 7 of pressure transmission device 5 as a result of recuperative braking of the wheels assigned to wheel brake cylinders 8, a reaction force applied to the driver of the vehicle at brake pedal 2 remains constant. For the recuperative braking, a generator not shown in further detail may be coupled to the axle assigned to wheel brake cylinders 8, whereupon the generator generates electricity that is stored in a battery.

In the following, pressure transmission device 5 is explained in further detail with reference to FIG. 2.

Inlet 6 of pressure transmission device 5 has a cylinder 21 having a piston 22 guided in it in displacement direction 28. Cylinder 21 forms, with piston 22, a chamber 23 in which the pressure of master brake cylinder 4 is applied to piston 22.

In the same manner, outlet 7 has a cylinder 24 having a piston 25 guided in it in displacement direction 29. Piston 25 forms, with cylinder 24, a chamber 26 in which the brake pressure of wheel brake cylinders 8 is applied; in some instances, the brake pressure of the wheel brake cylinders being modified by brake pressure modulation device 11.

Pistons 22 and 25 are intended to be displaceable along a common center line 27 under the influence of the pressures respectively applied to them; that is, actuating directions 28 and 29 are coaxial. Cylinders 21, 24 are fixed to a housing 31 of pressure transmission device 5, the respective pistons 22 and 25 extending into an interior 32 of housing 31.

At its housing-side end, piston 22 has a flange 33 that is set up to move two transmission elements 34, 35 along center line 27 or parallel to it.

Figure 2:
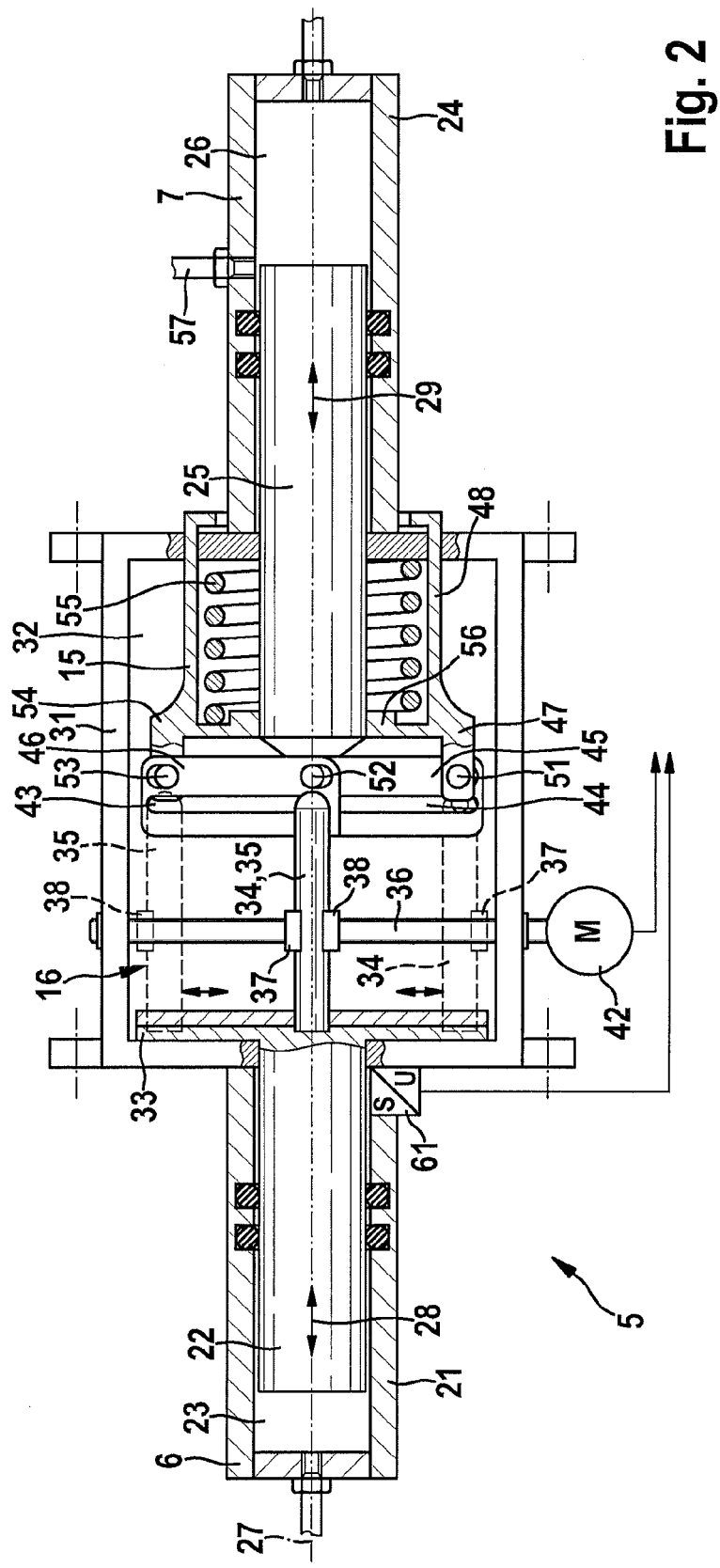
FIG. 2 shows an enlarged view of a pressure transmission device from FIG. 1.

In FIG. 2, transmission elements 34, 35 are positioned one behind the other on center line 27, which is why only one of these can be seen, namely, as a solid line. This corresponds to a first adjustment position of transmission elements 34, 35. In addition, FIG. 2 shows the two transmission elements 34, 35 with dashed lines, as they could be arranged in a second adjustment position, set apart from center line 27 and symmetric with respect to it. In order to move transmission elements 34, 35 between their first and their second adjustment positions, a threaded spindle 36 is provided. Threaded spindle 36 is rotationally mounted to housing 31 and extends perpendicularly to center line 27, as does flange 33. Transmission elements 34, 35 are connected to guide shoes 37, 38, which mate with the thread of threaded spindle 36. When threaded spindle 36 rotates, transmission elements 34 and 35 travel, together with their respective guide shoes 37 and 38, in opposite directions, from their first adjustment position into their second adjustment position. Threaded spindle 36 is rotated by a driving device 42, in particular, in the form of an electric motor, which is controlled by control device 17.

Opposite to flange 33 of piston 22, transmission elements 34, 35 engage with slots 43, 44 in rocker arms 45, 46, which are each constructed, for example, as approximately rectangular plates. That is, transmission element 34 engages with rocker arm 45, and transmission element 35 engages with rocker arm 46.

At a section 47 of a jar 48 of accumulator 15, rocker arm 45 is pivoted at its one end with the aid of a pivot point 51. At its other end, rocker arm 45 is pivoted on piston 25 at a pivot point 52. Pivot point 52 is situated on center line 27.

On its one end, rocker arm 46 is pivoted at a pivot point 53 at a section 54 of jar 48 opposite to section 47. On its other end, rocker arm 46 is likewise pivoted at pivot point 52.

A spring 55, in particular, a helical spring, is accommodated in jar 48 of accumulator 15, the spring resting against housing 31 at its one end and resting against the base of the jar 56 at its other end.

Outlet 7, in particular, chamber 26, may be connected to a tank 58 by a breather line 57; see also FIG. 1; the connection of breather line 57 being occluded by piston 25, as soon as it moves out of its original position shown in FIG. 2, thus, when braking.

In normal operation of brake system 1, thus, when the driver does not manipulate brake pedal 2, breather line 57 connects chamber 26, and consequently, brake pressure modulation device 11 and wheel brake cylinders 8, to tank 58, so that hydraulic fluid may flow for level adjustment, or evacuating and venting first (or second) brake circuit 12 is possible.

If the driver now manipulates brake pedal 2, then brake system 1 is initially in a braking mode without recuperation. Transmission elements 34, 35 are in their first adjustment position, which is represented in the figures by a solid line. Thus, the pressure built up by brake pedal 2, brake booster 3 and master brake cylinder 4 acts upon piston 22, and along center line 27, through transmission elements 34, 35, directly upon piston 25, which, in turn, pressurizes wheel brake cylinders 8. In this first adjustment position, nearly 100% of the pressure applied at inlet 6 is transmitted to wheel brake cylinders 8. In this first adjustment position, since rocker arms 45, 46 may rotate freely about their pivot points 51, 53 (due to corresponding slotted holes), accumulator 15 is not moved, that is, spring 55 is not compressed, and therefore, accumulator 15 is not charged.

If, for example, control device 17 now decides that a switchover shall be made from the braking mode without recuperation to a braking mode with recuperation, control device 17 controls electric motor 42 in such a manner, that transmission elements 34, 35 move along spindle 36 into their second adjustment position or an intermediate position. In this manner, a portion of the actuation energy is now taken for actuating wheel brake cylinders 8 (intermediate position), or this is taken completely (second adjustment position) from the hydraulic fluid present in chamber 26 and, consequently, from wheel brake cylinders 8, and transferred into accumulator 15; its spring 55 being compressed in the process. In this context, the pressure at inlet 6, i.e., in chamber 23, remains constant, which means that the driver does not sense any reaction forces at all at brake pedal 2. In this braking mode with recuperation, at least a portion of the braking torque acting upon the wheels is now applied by the generator not shown.

If the recuperative braking is subsequently ended, for example, since the accumulator is full, control device 17 controls electric motor 42 again, so that transmission elements 34, 35 move out of their second adjustment position or their intermediate position, into their first adjustment position again. In this context, the actuation energy stored in reservoir 15 is released again to the hydraulic fluid at outlet 7, i.e., in chamber 26. In this case, jar 48 moves back again into its original position illustrated in FIG. 2. In this context, transmission elements 34, 35 function as points of rotation for the rocker arms 45, 46 acting as balancing rockers. The energy transfer between accumulator 15 and the hydraulic fluid present at outlet 7 is comparatively efficient, which means that electric motor 42 may be designed to be low-powered and, therefore, small and inexpensive.

When moving transmission elements 34, 35 out of their second adjustment position or intermediate position, into their first adjustment position, a displacement sensor 61, which is connected to control device 17, monitors the position of piston 22. As soon as it also moves only very slightly, control device 17 may stop electric motor 42 or reduce the speed of motion, in order to keep the reaction forces at brake pedal 2 constant. Such a movement of piston 22 may occur, since the different components of pressure transmission device 5, for example, piston 25 and tilting levers 45, 46, are encumbered by friction. If the moving of transmission elements 34, 35 into their first adjustment position is prematurely stopped, the actuation energy still remaining in accumulator 15 is released at the end of the braking interval, that is, in normal operation of brake system 1. The driver also does not sense any of this. A pressure sensor may also be used in place of displacement sensor 61.

Power-assisted braking system 1 has the particular distinction, that in normal operation, in particular, for emergency braking, the driver is directly connected to wheel brake cylinders 8, so that a delay in a pressure build-up of brake system 1 is minimal. If the power supply fails, transmission elements 34, 35 move back into their first adjustment position with the aid of a device not shown, which may be a spring, provided that the transmission elements were not previously in their first adjustment position. In this state, it is ensured that the pressure at piston 28 is directly transmitted to piston 29.

Figure 3:
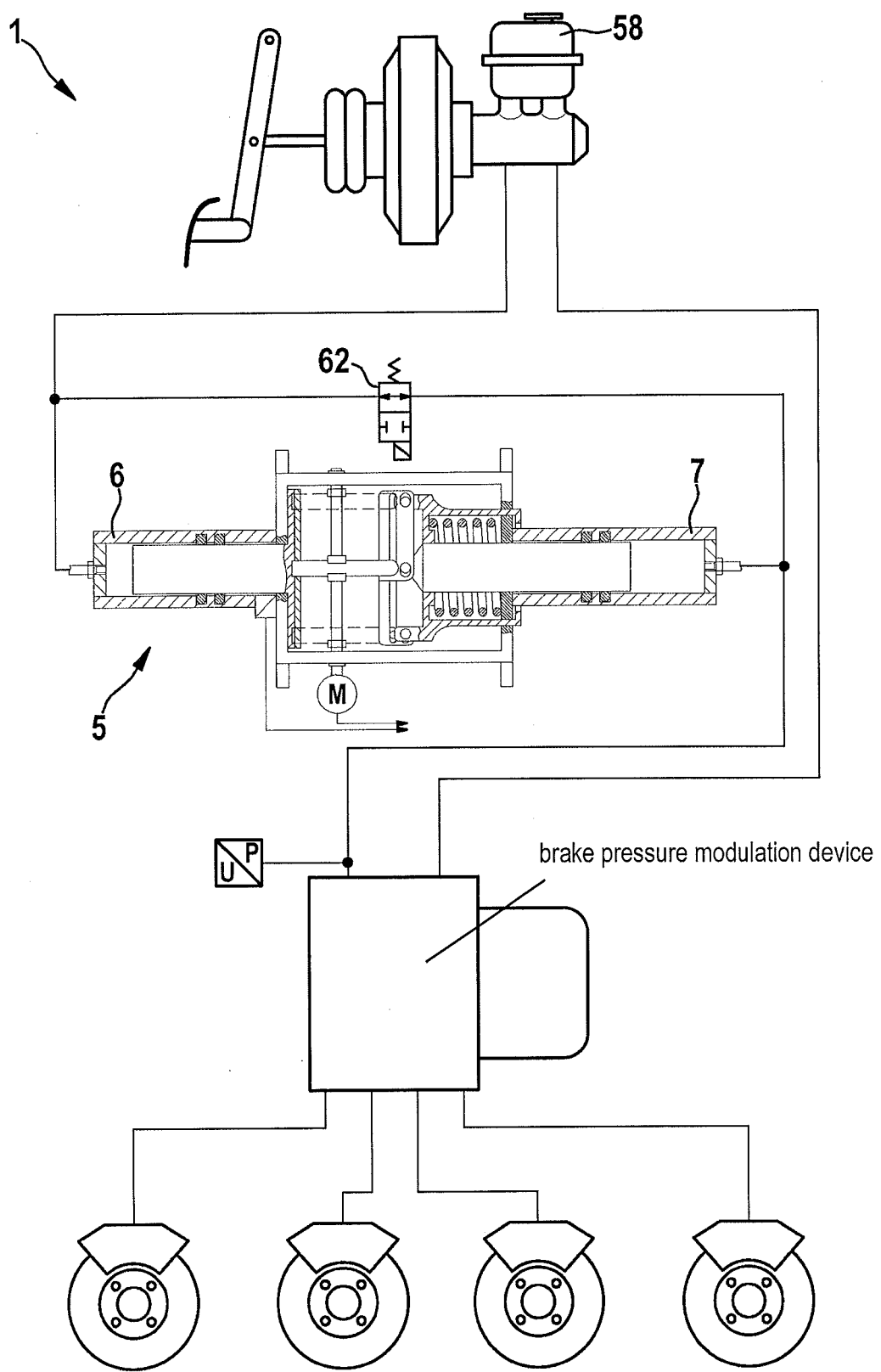
FIG. 3 shows a variant of FIG. 1.

FIG. 3 shows a variant of FIG. 1, the outlet 7 of pressure transmission device 5 not being connected to tank 58 by breather line 57, as in the case of the exemplary embodiment shown in FIGS. 1 and 2, but being connected to inlet 6 of pressurization device 5 by a separating valve 62. Separating valve 62 may be open in a de-energized state, as illustrated in FIG. 3, and is energized, and therefore closed, as soon as a driver's braking command is sensed.

Figure 4:
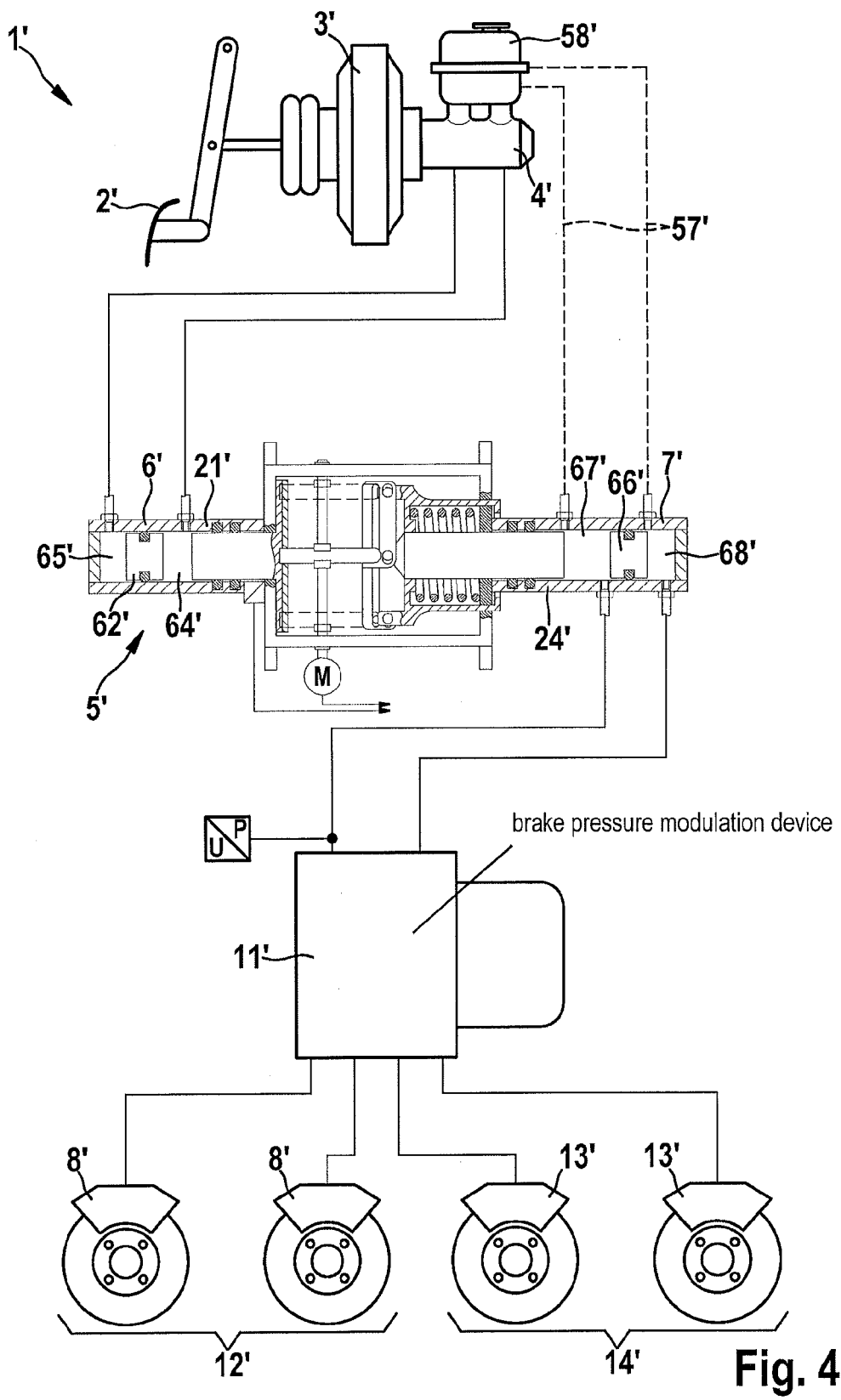
FIG. 4 shows a power-assisted braking system according to a second exemplary embodiment of the present invention.

FIG. 4 shows a power-assisted braking system 1' according to a second exemplary embodiment of the present invention. In the following, only the differences with respect to the exemplary embodiment according to FIGS. 1 and 2 are discussed. In power-assisted braking system 1', the pressure in the two brake circuits 12', 14' is determined by pressure transmission device 5'. To that end, inlet 6' of pressure transmission device 5' has a floating piston 63', which subdivides cylinder 21' of inlet 6' into a chamber close to the piston 64' and a chamber distant from the piston 65'. In a corresponding manner, outlet 7' also has a floating piston 66', which subdivides cylinder 24' of outlet 7' into a chamber close to the piston 67' and a chamber distant from the piston 68'.

Chamber 65' is connected to a first chamber of master brake cylinder 4 not shown, chamber 67' is connected to wheel brake cylinders 8'. Chamber 64' is hydraulically connected to a second chamber of master brake cylinder 4', chamber 68' is connected to wheel brake cylinders 13'. Consequently, two brake circuits 12' and 14' are formed. In each instance, the same brake pressure is applied to wheel brake cylinders 8', 13' and is controlled, inter alia, by pressure transmission device 5'. Thus, for example, all four wheels, to which wheel brake cylinders 8', 13' are assigned, could be recuperatively braked without the driver sensing a reaction force at brake pedal 2'.

Chambers 67', 68' may each be connected to tank 58' by a breather line 57', as already explained in connection with the exemplary embodiment shown in FIGS. 1 and 2.

Figure 5:
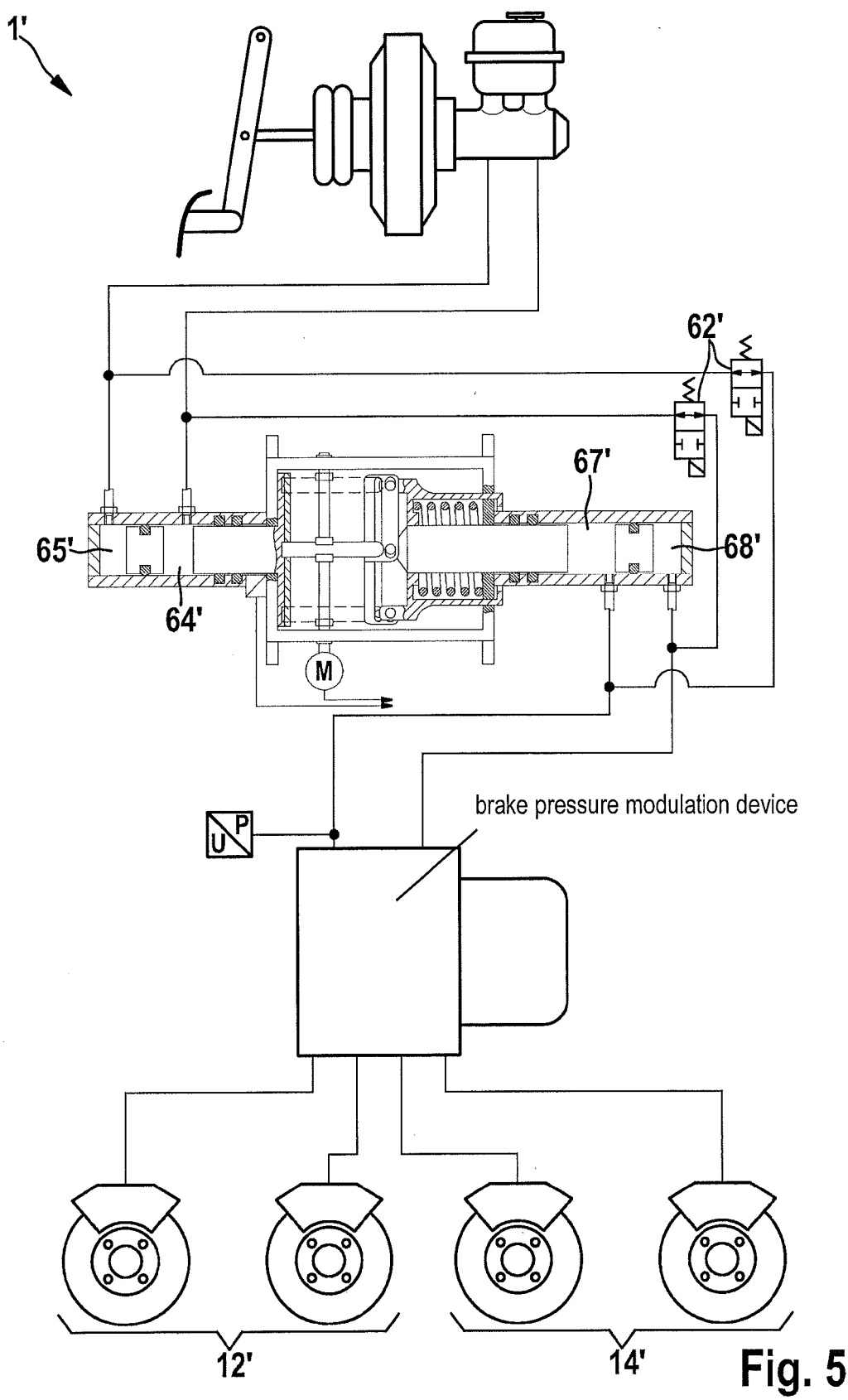
FIG. 5 shows a variant of FIG. 4.

FIG. 5 shows a variant of FIG. 4, separating valves 62' being provided in place of breather lines 57', the separating valves interconnecting chambers 65' and 67', as well as chambers 68' and 64'. In this context, the function of separating valves 62' corresponds to the function of separating valve 62, which was already explained above in connection with FIG. 3.

Although the present invention has been described here in terms of preferred exemplary embodiments, it is by no means limited to them, but rather is modifiable in numerous ways. In particular, it should be emphasized that in this case, the word "a" does not rule out a plurality.

What is claimed is:

1. A pressure transmission device for a power-assisted braking system of a vehicle, comprising:
    an inlet, the inlet of the pressure transmission device being connectible in a hydraulically operative manner to a master brake cylinder of the power-assisted braking system;
    an outlet, the outlet of the pressure transmission device being connectible in a hydraulically operative manner to at least one wheel brake cylinder of the power-assisted braking system;
    an accumulator; and
    a linkage, wherein the linkage transmits a pressure difference between the inlet and the outlet to the accumulator, and stores the pressure difference in the accumulator;
    wherein at least one of: i) the inlet has a first cylinder having a first piston which is guided in the first cylinder and is movable in a first displacement direction, and to which a first pressure is applied, and ii) the outlet has a second cylinder having a second piston, which is guided in the second cylinder and is movable in a second displacement direction, and at which a second pressure is present, and
    wherein the linkage has a stationary adjusting spindle running perpendicularly to the first displacement direction of the first piston and at least one transmission rod, which is supported at the adjusting spindle and is moveable in the first displacement direction by the first piston and is movable in an axial direction of the adjusting spindle.

2. The pressure transmission device as recited in claim 1, wherein the transmission rod is operatively connected to a rocker arm, which is pivoted at an actuating section of the accumulator on its one end and is pivoted at the second piston on its other end.

3. The pressure transmission device as recited in claim 2, wherein two transmission rods are provided, which, in a first adjustment position of the same, are situated on a center line that is coaxial with the first and second displacement directions of the first and second pistons and, in a second adjustment position, are symmetrically set apart from the center line; in the first adjustment position, the two transmission rods act upon the second piston via one of pivot points or a common pivot point of their respectively assigned rocker arms; and in the second adjustment position, the two transmission rods act upon the actuation section of the accumulator via pivot points of their respectively assigned rocker arms.

4. The pressure transmission device as recited in claim 2, wherein the accumulator is a stored-energy spring mechanism, and the actuation section is formed by a jar, the jar accommodating a spring, and the jar is moveable along the center line, in order to actuate the spring and, consequently, charge the accumulator.

5. The pressure transmission device as recited in claim 1, further comprising:
    a driving device for moving the transmission rod in the axial direction of the adjusting spindle.

6. The pressure transmission device as recited in claim 5, wherein the driving device is an electric motor.

7. The pressure transmission device as recited in claim 1, wherein the adjusting spindle is a threaded spindle, on which the transmission rod is supported.

8. A method for controlling a pressure transmission device, for a power-assisted braking system of a vehicle, the device including a master brake cylinder, a wheel brake cylinder to brake a wheel of the vehicle, a pressure transmission device having an inlet connected in a hydraulically operative manner to the master brake cylinder, an outlet connected in a hydraulically operative manner to the wheel brake cylinder, an accumulator, and a linkage, the method comprising:
    transmitting, via the linkage, a pressure difference between the inlet and the outlet to the accumulator and stores the pressure difference in the accumulator; and
    adjusting, via a control device, a pressure transmitted by the pressure transmission device between the inlet and the outlet during recuperative braking of the wheel;
    wherein the transmitted pressure is adjusted so that in the case of a pressure change at the outlet of the pressure transmission device resulting from recuperative braking of a wheel, a reaction force exerted on the driver of the vehicle at a brake pedal remains constant.

9. The method as recited in claim 8, wherein in the case of braking the wheel without recuperation, at least one transmission element of the pressure transmission device is in a first adjustment position along a center line, and a pressure built up by the brake pedal and a master brake cylinder is transmitted to a piston assigned to the inlet of the pressure transmission device, and transmitted along the center line, through the at least one transmission element, to a piston, which is assigned to the outlet and pressurizes a wheel brake cylinder of the wheel.

10. The method as recited in claim 9, wherein when a switchover is made from braking without recuperation to recuperative braking, the at least one transmission element is moved along an adjusting spindle of the linkage, from a first adjustment position into a second adjustment position set apart from the center line; and an actuation energy for actuating the wheel brake cylinder is transferred at least partially from the wheel brake cylinder into the accumulator.

11. The method as recited in claim 10, wherein when a switchover is made from recuperative braking to braking without recuperation, the at least one transmission element is moved from the second adjustment position into the first adjustment position, a movement of the piston assigned to the inlet being monitored, and when a movement of the piston is detected, the moving of the at least one transmission element from the second adjustment position into the first adjustment position is one of slowed down or stopped, in order to adjust a reaction force at the brake pedal.

12. The method as recited in claim 11, wherein the reaction force at the brake pedal is kept constant.

13. A power-assisted braking system for a vehicle, comprising:
a master brake cylinder;
a wheel brake cylinder to brake a wheel of the vehicle;
a pressure transmission device having an inlet connected in a hydraulically operative manner to the master brake cylinder, an outlet connected in a hydraulically operative manner to the wheel brake cylinder, an accumulator, and a linkage, wherein (i) in a first adjustment position, the linkage is configured to transmit a pressure at the inlet to the wheel brake cylinder and (ii) in a second adjustment position, the linkage is configured to transmit a pressure difference between the inlet and the outlet to the accumulator, and to store the pressure difference in the accumulator; and
a control device which adjusts a pressure transmitted by the pressure transmission device between the inlet and the outlet during recuperative braking of the wheel,
wherein at least one of: i) the inlet has a first cylinder having a first piston which is guided in the first cylinder and is movable in a first displacement direction, and to which a first pressure is applied, and ii) the outlet has a second cylinder having a second piston, which is guided in the second cylinder and is movable in a second displacement direction, and at which a second pressure is present, and
wherein the linkage has a stationary adjusting spindle running perpendicularly to the first displacement direction of the first piston and at least one transmission rod.

14. The braking system as recited in claim 13, wherein the outlet of the pressure transmission device is one of: i) connected to a tank by a breather line or ii) connected to the inlet of the pressure transmission device by a separating valve.

15. A power-assisted braking system for a vehicle, comprising:
a master brake cylinder;
a wheel brake cylinder to brake a wheel of the vehicle;
a pressure transmission device having an inlet connected in a hydraulically operative manner to the master brake cylinder, an outlet connected in a hydraulically operative manner to the wheel brake cylinder, an accumulator, and a linkage, wherein the linkage transmits a pressure difference between the inlet and the outlet to the accumulator, and stores the pressure difference in the accumulator; and
a control device to adjust a pressure transmitted by the pressure transmission device between the inlet and the outlet during recuperative braking of the wheel;
wherein the inlet of the pressure transmission device is connected in a hydraulically operative manner to chambers of the master brake cylinder, and the outlet of the pressure transmission device is connected in a hydraulically operative manner to wheel brake cylinders, and the chambers and the wheel brake cylinders are assigned to different brake circuits,
wherein at least one of: i) the inlet has a first cylinder having a first piston which is guided in the first cylinder and is movable in a first displacement direction, and to which a first pressure is applied, and ii) the outlet has a second cylinder having a second piston, which is guided in the second cylinder and is movable in a second displacement direction, and at which a second pressure is present, and
wherein the linkage has a stationary adjusting spindle running perpendicularly to the first displacement direction of the first piston and at least one transmission rod.

16. The braking system as recited in claim 15, wherein the inlet of the pressure transmission device has a first cylinder having a first piston which is guided in the first cylinder and is movable in a first displacement direction, and to which a first pressure is applied, and the outlet has a second cylinder having a second piston, which is guided in the second cylinder and is movable in a second displacement direction, and at which a second pressure is present, and wherein the first and second cylinders are each provided with a floating piston, which subdivides a specific cylinder into a chamber close to the piston and a chamber distant from the piston, and the chambers close to the piston and the chambers distant from the piston are assigned to the different brake circuits.

17. A pressure transmission device for a power-assisted braking system of a vehicle, comprising:
an inlet, the inlet of the pressure transmission device being connectible in a hydraulically operative manner to a master brake cylinder of the power-assisted braking system;
an outlet, the outlet of the pressure transmission device being connectible in a hydraulically operative manner to at least one wheel brake cylinder of the power-assisted braking system;
an accumulator; and
a linkage, wherein (i) in a first adjustment position, the linkage is configured to transmit a pressure at the inlet to the at least one wheel brake cylinder and (ii) in a second adjustment position, the linkage is configured to transmit a pressure difference between the inlet and the outlet to the accumulator, and to store the pressure difference in the accumulator,
wherein at least one of: i) the inlet has a first cylinder having a first piston which is guided in the first cylinder and is movable in a first displacement direction, and to which a first pressure is applied, and ii) the outlet has a second cylinder having a second piston, which is guided in the second cylinder and is movable in a second displacement direction, and at which a second pressure is present, and
wherein the linkage has a stationary adjusting spindle running perpendicularly to the first displacement direction of the first piston and at least one transmission rod.

18. A power-assisted braking system for a vehicle, comprising:
a master brake cylinder;
a wheel brake cylinder to brake a wheel of the vehicle;
a pressure transmission device having an inlet connected in a hydraulically operative manner to the master brake cylinder, an outlet connected in a hydraulically operative manner to the wheel brake cylinder, an accumulator, and a linkage, wherein the linkage transmits a pressure difference between the inlet and the outlet to the accumulator, and stores the pressure difference in the accumulator; and a control device which adjusts a pressure transmitted by the pressure transmission device between the inlet and the outlet during recuperative braking of the wheel;

wherein the control device controls the transmitted pressure in such a manner, that in the case of a pressure change at the outlet of the pressure transmission device resulting from recuperative braking of the wheel, a reaction force exerted on the driver of the vehicle at a brake pedal remains constant.

19. A vehicle having a power-assisted braking system, comprising:

a master brake cylinder;

a wheel brake cylinder to brake a wheel of the vehicle;

a pressure transmission device having an inlet connected in a hydraulically operative manner to the master brake cylinder, an outlet connected in a hydraulically operative manner to the wheel brake cylinder, an accumulator, and a linkage, wherein i) in a first adjustment position, the linkage is configured to transmit a pressure at the inlet to the wheel brake cylinder and ii) in a second adjustment position, the linkage is configured to transmit a pressure difference between the inlet and the outlet to the accumulator, and to store the pressure difference in the accumulator; and a control device which adjusts a pressure transmitted by the pressure transmission device between the inlet and the outlet during recuperative braking of the wheel, wherein at least one of: i) the inlet has a first cylinder having a first piston which is guided in the first cylinder and is movable in a first displacement direction, and to which a first pressure is applied, and ii) the outlet has a second cylinder having a second piston, which is guided in the second cylinder and is movable in a second displacement direction, and at which a second pressure is present, and wherein the linkage has a stationary adjusting spindle running perpendicularly to the first displacement direction of the first piston and at least one transmission rod.

20. A method for controlling a pressure transmission device, for a power-assisted braking system of a vehicle, the device including a master brake cylinder, a wheel brake cylinder to brake a wheel of the vehicle, a pressure transmission device having an inlet connected in a hydraulically operative manner to the master brake cylinder, an outlet connected in a hydraulically operative manner to the wheel brake cylinder, an accumulator, and a linkage, the method comprising:

adjusting, via a control device, a pressure transmitted by the pressure transmission device between the inlet and the outlet during recuperative braking of the wheel, wherein the linkage (i) in a first adjustment position, transmits a pressure at the inlet to the wheel brake cylinder and (ii) in a second adjustment position, transmits a pressure difference between the inlet and the outlet to the accumulator, and stores the pressure difference in the accumulator, wherein at least one of: i) the inlet has a first cylinder having a first piston which is guided in the first cylinder and is movable in a first displacement direction, and to which a first pressure is applied, and ii) the outlet has a second cylinder having a second piston, which is guided in the second cylinder and is movable in a second displacement direction, and at which a second pressure is present, and wherein the linkage has a stationary adjusting spindle running perpendicularly to the first displacement direction of the first piston and at least one transmission rod.

21. A method for controlling a power-assisted braking system, the system including a master brake cylinder, a wheel brake cylinder for braking a wheel of the vehicle, a pressure transmission device having an inlet connected in a hydraulically operative manner to the master brake cylinder, and an outlet connected in a hydraulically operative manner to the wheel brake cylinder, an accumulator, and a linkage, the method comprising:

adjusting, via the linkage, a pressure transmitted by the pressure transmission device between an inlet and the outlet, wherein the linkage (i) in a first adjustment position, transmits a pressure at the inlet to the wheel brake cylinder and (ii) in a second adjustment position, transmits a pressure difference between the inlet and the outlet to the accumulator, and stores the pressure difference in the accumulator, wherein at least one of: i) the inlet has a first cylinder having a first piston which is guided in the first cylinder and is movable in a first displacement direction, and to which a first pressure is applied, and ii) the outlet has a second cylinder having a second piston, which is guided in the second cylinder and is movable in a second displacement direction, and at which a second pressure is present, and wherein the linkage has a stationary adjusting spindle running perpendicularly to the first displacement direction of the first piston and at least one transmission rod.

* * * * *